July 25, 1933.      G. A. STONE      1,919,538
PROCESS AND APPARATUS FOR MAKING ELECTRICAL MEASUREMENTS
Filed Oct. 27, 1931
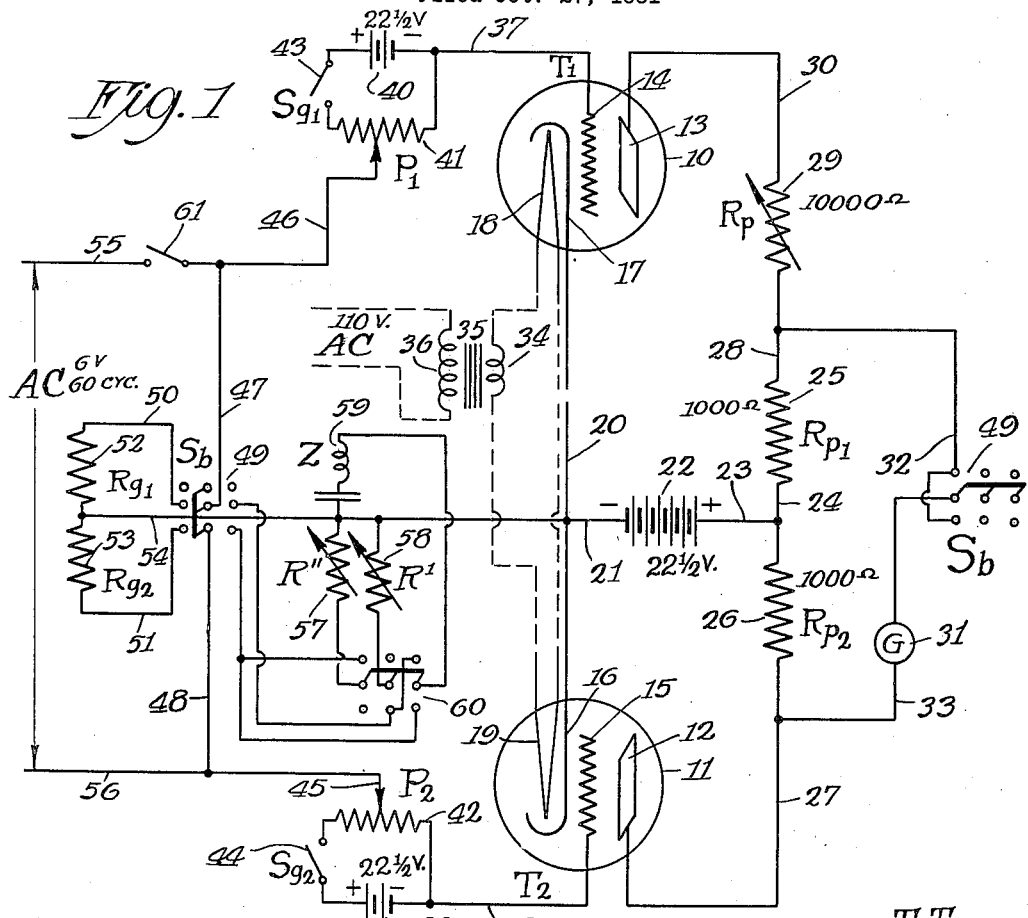
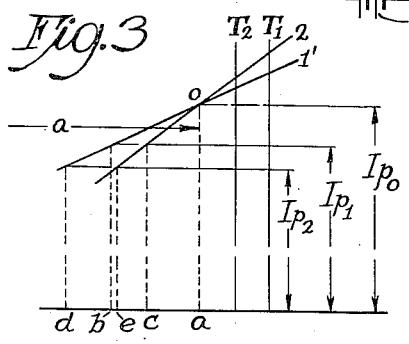
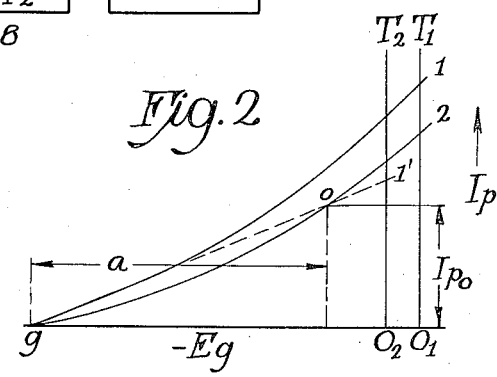
Inventor
Guy A. Stone Patented July 25, 1933

1,919,538

UNITED STATES PATENT OFFICE

GUY A. STONE, OF ANN ARBOR, MICHIGAN, ASSIGNOR TO CENTRAL SCIENTIFIC COMPANY, OF CHICAGO, ILLINOIS, A CORPORATION OF ILLINOIS

PROCESS AND APPARATUS FOR MAKING ELECTRICAL MEASUREMENTS

Application filed October 27, 1931. Serial No. 571,375.

The principal object of this invention is to enable electrical impedances and related electrical quantities to be accurately and quickly measured by persons of only slight skill in such operations. Further objects, advantages and applications of the invention will be revealed as the disclosure proceeds and the description is read in connection with the accompanying drawing, part of which shows a particular apparatus illustrating the invention and which has been found satisfactory for measuring impedances, and others of which illustrate certain phases of the theory of operations.

Fig. 1 is a schematic wiring diagram of an apparatus including two similar five-point vacuum tubes with appropriate main and auxiliary circuits for carrying out the procedure;

Fig. 2 is a diagram of characteristic curves of the two vacuum tubes shown in Fig. 1;

Fig. 3 is an enlargement of a portion of the diagram shown in Fig. 2, about the point where the curves of the two tubes intersect;

Fig. 4 is a curve obtained by plotting impedances as abscissas against the reciprocals of the capacitances as ordinates in one use of the apparatus shown in Fig. 1.

In Fig. 1, 10 and 11 indicate similar five-point vacuum tubes, including plates 12 and 13, grids 14 and 15, cathodes 16 and 17 and filaments 18 and 19.

The cathodes are connected by 20, which is connected by 21 with the common battery 22 of 22½ volts, which is connected by 23 with a common lead 24 to equal resistances 25, 26 of 1000 ohms, one of which is connected by 27 with the plate 12 and the other of which is connected by 28 with a variable resistance 29 of 10,000 ohms, or over, which, in turn, is connected by 30 with the plate 13. A galvanometer 31 is shunted across the equal resistances, 25 and 26 by the connections 32 and 33. The galvanometer has an external critical damping resistance of approximately 2000 ohms and a current sensitivity of approximately .5 micro-amperes per scale division.

The filaments 18 and 19 are connected in series with a secondary 34 of a transformer 35, the primary 36 of which is connected with a source of 110 volts, A. C. The grids 14 and 15 are connected by 37 and 38 with the negative poles of batteries 39 and 40 of 22½ volts each.

10,000 ohm potentiometers 41 and 42 are shunted across the batteries 39 and 40. Switches 43 and 44 are inserted to permit the batteries to be cut in and out of the grid circuits at will.

The variable contacts of the potentiometers are connected by 46 and 47, 45 and 48, through a triple-pole double-throw switch 49, with 50 and 51 which lead to equal impedances 52 and 53 both of which are connected to 54 leading back to the cathode connection 20. Switch 61 is in A. C. line 55 and 56 of 60 cycles and approximately 6 volts.

Variable known impedances 57 and 58, and an unknown impedance 59 are so connected through three-pole double-throw switch 60 to two poles of the switch 49 that one of the known impedances 57 and 58 may be substituted for either of the known impedances 52 and 53, and the unknown substituted at the same time for the other of the known impedances 52 and 53 by throwing the switches 49 and 60.

Operation

As a preliminary operation open switch 61, throw switch 49 to the left, close the switches 43 and 44 and adjust the movable contacts of the potentiometers 41 and 42 to lower the potential of the grids below the cut-off potentials; light the filaments and allow time to heat; set the variable resistance 29 at its smallest value.

Separately adjust the potentiometers 41 and 42 to the cut-off point, as follows:

Adjust the movable contact of the potentiometer 41 until the galvanometer 31 registers an appreciable current, reverse the adjustment until the galvanometer just reaches zero; adjust the movable contact of the potentiometer 42 until the galvanometer registers an appreciable deflection in the opposite direction; and reverse the travel of the movable contact until the galvanometer again registers zero. The current in the two plate circuits is now at zero and the grid potentials are at the cut-off point.

Close the switch 61 to impress an A. C. E. M. F. of constant frequency across 52 and 53 which, in one use of the apparatus in Fig. 1, was approximately 6 volts. In general, unequal currents will be caused to flow in the plate circuits of the two tubes, and the inequality will be indicated by the galvanometer 31.

Increase the variable resistance 29 until the galvanometer 31 returns to and remains at zero. (In some instances it will be necessary to interchange the vacuum tubes).

Throw the switch 60 to the down position in Fig. 1; throw the switch 49 to the right; adjust the variable impedance 58 until the galvanometer 31 returns to and remains at zero.

Throw the switch 60 to the upper position; adjust the variable impedance 57 until the galvanometer returns to and remains at zero.

Of course, it is always advisable in an apparatus of this kind to repeat the operation several times as a check. Sometimes it is found that a readjustment of the resistance 29 is necessary, in which case readjustments of the impedances 57 and 58 will also be necessary to prevent error.

Particular attention is invited to the fact that in this diagram, Fig. 1, the switch 49 is shown at the right and the left of the figure. This was done to prevent leading the wires from one side to the other and complicating the diagram.

Particular attention is also invited to the fact that this switch, of whatever type, should be so arranged that the galvanometer circuit should close after the other circuits and open in advance of the other circuits in order to prevent violent deflection of the galvanometer.

The value of the unknown impedance 59 may now be readily calculated by extracting the square root of the product of the impedances 57 and 58 that brought the galvanometer to zero in the above operation.

It is of interest to note that even though it was found necessary to readjust the resistance 29 and then readjust the impedances 57 and 58, the products of the latter values before and after the readjustments were equal.

Discussion

In this discussion it will be convenient to use the common electrical symbols rather than the reference numerals used in the above description, and these symbols have been placed on the drawing.

When the alternating E. M. F. is applied across the two equal impedances $Rg1$, $Rg2$, shown in the left of the diagram (which may be of any character provided they are congruent) in the grid circuits of the tubes and the resistance in the plate circuit of T1 is so adjusted that the galvanometer reads zero, the condition represented by the point $o$ in Figs. 2 and 3 is realized. In other words, the effective potentials so applied to each grid above the cut-off potentials are equal to $a$ in Figs. 2 and 3, and the equal plate current resulting in each tube is $Ipo$.

When, as described above, an unknown impedance Z is placed in the grid circuit of T1, and a variable known impedance $R''$ is placed in the grid circuit of T2 in place of the impedances $Rg1$ and $Rg2$, respectively, and the variable impedance $R''$ is adjusted until the galvanometer again rests at zero, the potential across Z will be $b$; that across $R''$ will be $c$; and the two equal plate currents will be $Ip1$. Thus, from the laws of impedance follows the equation:

$$(1) \quad \frac{Z}{R''} = \frac{b}{c}$$

When, by throwing the switch 60 to the reverse position the unknown impedance Z is placed in the grid circuit of T2, and the variable known impedance $R'$ is placed in the grid circuit T1, and the latter is adjusted until the galvanometer rests at zero, the potential across $R' = d$; the potential across $Z = e$; and the two equal plate currents will be $Ip2$.

Again, from the laws of impedance follows:

$$(2) \quad \frac{Z}{R'} = \frac{e}{d}$$

From Equations (1) and (2) it follows that $$(3) \quad \frac{Z^2}{R'R''} = \frac{b}{c} \cdot \frac{e}{d}$$

Whence, if the right member of Equation (3) is equal to unity, equation $$(4) \quad Z^2 = R'R''$$

$$(5) \quad Z = \sqrt{R'R''}$$

To prove that the right member of Equation (3) is equal to unity, referring to Fig. 3, you may write equation $$(6) \quad I_{p1} = I_{p_o} - M_1(a-b) = I_{p_o} - M_2(a-c)$$

where $M_1$ and $M_2$ are the slopes of the characteristic curves of the tubes T1 and T2 at the point $o$.

Also, now then $$(7) \quad I_{p2} = I_{p_o} - M_1(a-d) = I_{p_o} - M_2(a-e).$$

Equation (6) reduces to $$(8) \quad M_1(a-b) = M_2(a-c)$$

or $$(9) \quad M_2 c = (M_2 - M_1)a + M_1 b$$

Equation (7) reduces to $$(10) \quad M_1(a-d) = M_2(a-e)$$

or $$(11) \quad M_2 e = (M_2 - M_1)a + M_1 d.$$

If Equation (9) is divided by Equation (11)

(12) $\dfrac{M_2 c}{M_2 e} = \dfrac{(M_2-M_1)a + M_1 b}{(M_2-M_1)a + M_1 d}$ the right hand member of Equation (12) may be expanded by long division, and both the numerators and the denominators of the resulting fraction multiplied by $d$, so that

(13) $\dfrac{c}{e} = \dfrac{b}{d} + \dfrac{(M_2-M_1)a(d-b)}{(M_2-M_1)ad + M_1 d^2}$ Now, if the slopes $M_2$ and $M_1$ are very large in comparison to their difference $M_2 - M_1$, or if $d$ is approximately equal to $b$, or if both these conditions exist, Equation (13) reduces to

(14) $\dfrac{c}{e} = \dfrac{b}{d}$ or $\dfrac{b}{c}\dfrac{e}{d} = 1$

Equation (14) shows that the left member of (3) equals unity.

In the derivation of Equation (14) certain operating conditions are assumed. First, the deviations of the potentials $b$, $c$, $d$ and $e$ from the value $a$ must be small enough that the curves are essentially linear over this range about $o$. The second restriction on Equation (14) is that the point $o$ must be so located that the angle between the characteristic curves is small. That is, the difference between the slopes of the two curves at their point of intersection must be negligible in comparison with either one of them. (The location of the point $o$ at the potential $a$ is merely for the sake of convenience. It is apparent that any other point which satisfies both of the conditions mentioned will serve equally as well.)

The apparatus diagrammatically illustrated in Fig. 1 and the discussion submitted is sufficient to show how the procedure and apparatus of the same general character may be used to quickly and accurately measure impedances. The values inserted in the equations will, of course, vary according to the components of the impedances, the frequency of the voltage impressed on the grids of the tubes, etc.

The apparatus may also be used to determine the mutual inductance of two coils by substituting them for the impedance 59, connected first so that the mutual inductance of the coils is additive and, second, so that the mutual inductance is opposed to the self inductance of the coils. In the first case $$Z_1^2 = R^2 + 4\pi^2 F^2 L_1^2$$

and in the second case $$Z_2^2 = R^2 + 4\pi^2 F^2 L_2^2.$$

From these two relationships the value of $L_1$ and $L_2$ may be obtained and it follows that $$M = \dfrac{L_1 - L_2}{4}$$

Whenever the unknown impedance 59 is of large magnitude it is convenient to use as known impedances 57 and 58 calibrated variable condensers. Such an arrangement affords ready means for obtaining known impedances of high value.

Another use of the impedance bridge is to determine the frequency of the E. M. F. impressed upon it, preferably by the use for Z of a calibrated variable condenser. In such a measurement it is convenient to use for R′ and R″ non-inductive resistance boxes of proper size. If various capacitances are used for Z, and a series of balance points found (i. e., a series of values for R′ and R″) the impedance of the condensers for each setting is calculated in the usual way, from Equation (5).

But since the impedance Z is a pure capacitance

(15) $Z = \dfrac{1}{2\pi f C}$ consequently, from Equations (5) and (15)

(16) $1/C = 2\pi f \sqrt{R'R''}.$ where
$f$ = the frequency of the impressed E. M. F. in cycles per second.
$C$ = capacitance of the condenser for a particular setting, measured in farads.
$R'$ and $R''$ = the impedances required to balance the bridge for a setting of the condenser, the impedance being measured in ohms.

If the various capacitances C are measured in microfarads, Equation (16) becomes

(17) $1/C = \dfrac{2\pi}{10^6} f \sqrt{R'R''}$

Obviously, if the values of $1/C$ are plotted as ordinates against the corresponding values of $$\sqrt{R'R''}$$

as abscissas, as in Fig. 4, a straight line 1 is obtained whose slope, $\tan \theta$, is equal to $2\pi f 10^{-6}$. That is,

(18) $\tan \theta = 2\pi f 10^{-6}$

(19) $f = \dfrac{\tan \theta \, 10^6}{2\pi}$

A sample set of data is given below:
Plate potential = 22½ volts.
Precision calibrated variable condenser used as Z.
R′ and R″ were non-inductive resistance boxes.

| $C$ (μf) | $1/C$ (μf) | $R'$ (Ω) | $R'$ (Ω) | $\sqrt{R'R''}$ (Ω) |
|---|---|---|---|---|
| 1.000 | 1.000 | 154 | 135 | 144.5 |
| .700 | 1.430 | 221 | 195 | 208.0 |
| .500 | 2.000 | 305 | 277 | 291.0 |
| .250 | 4.000 | 630 | 550 | 590.0 |
| .100 | 10.00 | 1660 | 1340 | 1495 |
| .0500 | 20.00 | 3330 | 2690 | 2990 |
| .0250 | 40.00 | 6800 | 5370 | 6050 |
| .01925 | 52.00 | 9000 | 7000 | 7950 |

A further illustrative use of the apparatus is to calibrate a variable condenser with two calibrated variable condensers used for R' and R''.

In this situation, since all impedances involved are capacitative impedances, I may write for each—

$$(20) \quad Z = \frac{1}{2\pi f C_x}$$

$$(21) \quad R' = \frac{1}{2\pi f C'}$$

$$(22) \quad R'' = \frac{1}{2\pi f C''}$$

where, Z, R', R'' are measured in ohms and $C_x$, C', C'' are measured in farads. Combining Equations (20), (21) and (22) with Equation (5), above, $$(23) \quad \frac{1}{2\pi f C_x} = \sqrt{\frac{1}{2\pi f C'} \cdot \frac{1}{2\pi f C''}}$$

Simplifying $$(24) \quad 1/C_x = \frac{1}{\sqrt{C'C''}}$$

or $$(25) \quad C_x = \sqrt{C'C''}$$

Obviously, $C_x$ is measured in the same units as those used to express values of C' and C''. The theory also shows that in the calibration of a condenser $C_x$, in which known variable condensers are used for R' and R'', the frequency of the impressed E. M. F. is not involved. In practice, however, frequencies of the order of 1000 cycles per second are used in order that any effective series resistance associated with the condensers may be negligible. That the effective series resistance is less with higher frequencies follows from the fact that the product $RfC^2$ is substantially constant for a given condenser. The use of a high frequency was tacitly assumed in writing Equations (20), (21), and (22).

Many other uses will follow readily from the fact that the apparatus allows two impedances to be compared with one another, regardless of the relative amounts of capacitance, inductance, or resistance which make up the impedances.

When the same alternating current is passing through both impedances, the voltages taken across the two impedances are proportional to the values of the impedances, so that when the voltages so taken are equal, the impedances must be equal.

In the apparatus of Fig. 1, while an alternating current is passing in series through the two impedances to be compared, they are each connected in the grid circuit of one of the tubes $T_1$ and $T_2$. Previously, the resistance $R_p$ has been adjusted as described so that when the alternating voltages placed in the grid circuits are approximately equal, the pulsating direct currents resulting in the plate circuits of the tubes will be equal. Only when the load impedance of Z is equal to the load impedance of 52 or 53 can the value of the known variable impedance required to equalize the plate currents of the tubes be exactly equal to the unknown impedance, because it is difficult to obtain a simple source of alternating potential which is entirely independent of the load impedance placed across it. It is also apparent that the known impedance can not be equal in value to the unknown impedance unless it happens to be congruent with Z after it has been finally adjusted, for the A. C. characteristic of one tube (in other words, the relation between the effective value of the A. C. potential impressed about the cut-off potential on the grid of one tube and the effective plate current) will not coincide with the A. C. characteristic of the other tube, even when the alternating voltages placed in the two grid circuits are equal, so long as they are not the same as the equal voltages (taken across the equal impedances 52 and 53) which were previously placed in the grid circuits for the adjustment of the A. C. characteristics of the tubes.

Although it follows that either the value of R' or the value of R'' will be only approximately equal to the unknown impedance Z, the method of calculation which has been explained will give a very exact result for Z. Thus the amount of the impedance to be measured is immaterial. It can also be shown that the nature of the components which make up the unknown impedance Z is immaterial.

In general, the components—resistance, inductance, and capacitance—which make up the unknown impedance Z, will be unlike the components which make up the known variable impedance R' or R''. Hence, the voltage across Z will, in general, be out of phase with the voltage across the known variable impedance with which it is being compared. As a result, the pulsations of current set up in the plate circuits will be out of phase. Now the pulsating direct current in the plate circuit of tube $T_1$ will pass through the resistance $R_{p_1}$, which is in the galvanometer circuit 28—32—33—24, so that a pulsating direct E. M. F. will be introduced in the galvanometer circuit. Likewise, a pulsating direct E. M. F. out of phase with the former pulsating E. M. F., and opposite to it in sign, will be set up in the galvanometer circuit, across $R_{p_2}$. When these pulsating E. M. Fs. are equal effective value, they will add up to zero, regardless of their phase difference, when measured by a D. C. galvanometer. On the other hand, if the effective values of the plate currents are different, the galvanometer will read their difference. It will be remembered that two equal alternating currents or voltages will add up to zero only when they are 180° out of phase.

In order that impedances may be compared, whatever the nature of their componets, the adaptability of the invention to the comparison of alternating voltages of any magnitude is also important. This fact will follow from the principle that the voltages add vectorially, so that the magnitude of the two voltages to be compared may vary greatly with different components, while the sum of the two voltages remains constant at 6 volts.

A single variable known impedance may be substituted for the impedances 57 and 58. However, it has been found more convenient to use two known impedances.

$T_1$ and $T_2$ may be replaced by two D. C. tubes, with their filaments connected in parallel to a source of D. C. potential, for heating the filaments. Or any electrical valve, such as a galena crystal, may, of course, be used.

It is to be understood that for any of the impedances mentioned in the specification, a resistance, capacitance, inductance, or a compound impedance, may be used to suit the convenience of the individual.

I claim as my invention:

1. In an apparatus of the class described, two vacuum tubes each having a filament, a cathode, a grid, and a plate, means connecting the cathodes together and each cathode to its corresponding plate through a common battery and equal resistances, one plate circuit thus formed also including a variable resistance, a galvanometer shunted across the equal resistances in the plate circuits, means to heat the filaments, means to separately adjust the potential between each grid and its cathode to the cut-off point, means for placing an A. C. potential in the grid circuit of one tube and an equal A. C. potential in the grid circuit of the other tube including equal impedances in the respective grid circuits across which a potential is applied, means alternative to the last including a known impedance in one circuit and an unknown impedance in the other circuit across which an A. C. potential is applied, and means similar to the last but connecting the unknown impedance in the opposite circuit.

2. In an apparatus of the class described, two vacuum tubes each including a filament, a grid and a plate, means for connecting equal resistances in the plate circuits through a common battery, a variable resistance in one plate circuit, a galvanometer shunted across the equal resistances, means to heat the filaments, means to separately adjust the potential between each grid and its cathode to the cutoff point, means for placing an A. C. potential in the grid circuit of one tube and an equal A. C. potential in the grid circuit of the other tube including equal impedances in the respective grid circuits across which a potential is applied, means alternative to the last including a known impedance in one circuit and an unknown impedance in the other circuit across which an A. C. potential is applied, and means similar to the last but connecting the unknown impedance in the opposite circuit.

3. In an apparatus of the class described, two similar vacuum tubes each having a filament, a plate and a grid, plate circuits including a common battery and separate equal resistances, a galvanometer shunted across the resistances, an additional variable resistance in one of the plate circuits beyond the galvanometer shunt, means to heat the filaments, grid circuits including means to separately adjust the potentials to the cut-off points, means to place an A. C. potential in the grid circuit of one tube and an equal A. C. potential in the grid circuit of the other tube including equal impedances in the respective grid circuits, across which a potential is applied, means to substitute a variable known impedance for one of the equal impedances and an unknown impedance for the other equal impedance, and means to substitute the unknown impedance for the known variable impedance and replace the unknown impedance with a second known variable impedance.

4. In an apparatus of the class described, two similar vacuum tubes, each having a filament, a grid and a plate, plate circuits, a galvanometer shunted across similar portions of the plate circuits, grid circuits including means to separately adjust the potentials therein to the cut-off points, means to place an A. C. potential in the grid circuit of one tube and an equal A. C. potential in the grid circuit of the other tube including equal impedances in the respective grid circuits, across which a potential is applied, means to substitute a variable known impedance for one of the equal impedances and an unknown impedance for the other equal impedance, and means to substitute the unknown impedance for the known variable impedance and replace the unknown impedance with a second known variable impedance.

5. In an apparatus of the class described, two D. C. circuits balanced through an electrical valve, two similar D. C. circuits balanced through a similar electrical valve, means for impressing an A. C. E. M. F. across equal impedances in corresponding circuits of each pair of circuits, means to substitute a variable known impedance for one of the equal impedances and an unknown impedance for the other equal impedance, and means to substitute the unknown impedance for the known variable impedance and replace the unknown impedance with a second known variable impedance.

6. The process of measuring which includes—

(1) adjusting the grid potential of similar vacuum tubes to the cut-off point; (2) impressing an A. C. E. M. F. across equal impedances in the grid circuits of the tubes; (3) equalizing the currents in the plate circuits of the tubes; (4) substituting a known and an unknown impedance for the equal impedances in the two steps; (5) again equalizing the currents in the plate circuits of the tubes by varying the known impedance; (6) substituting the unknown impedance of the fourth step for the known impedance and replacing the unknown impedance with another known impedance; (7) again equalizing the plate circuits of the tubes by varying the known impedance.

7. The process of measuring, which includes impressing an A. C. E. M. F. across equal impedances in the grid circuits of two vacuum tubes when the potentials are at the cut-off point and the current in the plate circuits is zero, substituting an unknown impedance for one of the equal impedances and a known variable impedance for the other equal impedance, then substituting the unknown impedance for the known variable impedance and replacing the unknown impedance with another known variable impedance.

8. The process of measuring, which includes impressing an A. C. E. M. F. across equal impedances in corresponding D. C. circuits of two similar pairs of such circuits balanced by similar electrical valves, substituting an unknown impedance for one of the equal impedances and a known variable impedance for the other equal impedance, then substituting the unknown impedance for the known variable impedance and replacing the unknown impedance with another known variable impedance.

9. The process of determining the value of an impedance by placing it in the same A. C. circuit with a known variable impedance, and at the same time connecting each of the two impedances in the in-put circuit of one of two electron tubes having a common source of substantially constant E. M. F. in their out-put circuits, the potentials of which have previously been adjusted to the cut-off points, and the A. C. characteristics of which have been equalized for effective grid potentials approximating those to be applied, varying the known impedance to equalize the plate currents, interchanging the unknown and the known variable impedance, and again varying the latter to equalize the plate currents.

10. In an apparatus of the class described, two similar vacuum tubes each having a heated cathode, a grid, plate, grid circuit and plate circuit, means for lowering the grid potentials with respect to the cathodes, means for raising the plate potentials an equal and substantially fixed amount with respect to the cathodes, means for equalizing the A. C. characteristics of said tubes for effective grid potentials approximating those to be used, an A. C. circuit containing an unknown and a known impedance, means for connecting each of the impedances in one of said grid circuits, means for varying the known impedance, means for determining at what value of the known impedance the two plate currents are equal, and means for interchanging the unknown and the variable known impedance in their respective positions in the system.

11. In an apparatus of the class described, two similar electrical valves having in-put and out-put circuits, and having a common source of substantially constant E. M. F. in their out-put circuits, means for adjusting each valve to the cut-off point, means for equalizing the A. C. characteristics of said valves for effective in-put potentials approximating those to be used, an A. C. circuit containing an unknown and a variable known impedance, means for passing each of said in-put circuits through one of said impedances, and means for interchanging the unknown and the known impedance.

12. The method of calibrating a variable condenser which consists in applying an equal and substantially constant positive potential to the plates of two electron tubes, lowering the grid potentials, equalizing the A. C. characteristics of the tubes for effective grid potentials approximating those to be applied, connecting said condenser in one input circuit, connecting a variable calibrated condenser in the other input circuit, passing a uniform alternating current of high frequency in series through the two condensers, varying the calibrated condenser to equalize the plate currents, interchanging the two condensers, and again varying the calibrated condenser to equalize the plate currents.

13. In an apparatus of the class described, two similar electrical valves having input and output circuits, means for equalizing the A. C. characteristics of the valves for effective input potentials approximating those to be used, an A. C. circuit containing a known impedance and a variable known impedance through which an alternating current of unknown frequency is passed in series, means for connecting one of the impedances in one input circuit and the other impedance in the other input circuit, means for comparing the output currents of the valves for any setting of the variable known impedance, means to substitute the first impedance for the variable impedance, and means to place a variable known impedance at the position in the circuits first occupied by the first impedance.

14. The method of measuring the frequency of an alternating current which includes equalizing the A. C. characteristics of two similar electrical valves for effective input potentials approximating those to be used, placing a calibrated condenser in the input circuit of one of said valves and a known variable resistance in the input circuit of the other, passing said alternating current through the impedances in series, varying the resistance to equalize the output currents of the valves, substituting the condenser for the resistance, placing a known variable resistance in the circuits at the position first occupied by the condenser, and again varying the resistance to equalize the output currents of the valves.

15. The method of measuring an impedance which includes applying an equal and substantially constant positive potential to the plates of two electrical vacuum-tube rectifiers, lowering the grid potentials, equalizing the A. C. characteristics of the tubes for effective grid potentials approximating those to be applied, connecting said impedance in one input circuit, connecting a variable known impedance in the other input circuit, passing a uniform alternating current through the two impedances in series, varying the known impedance to equalize the plate currents, substituting the unknown impedance for the known impedance, placing a known variable impedance at the position in the circuits first occupied by the unknown impedance, and again varying the known impedance to equalize the plate currents.

16. In an apparatus of the class described, two similar electrical valves having input and output circuits, means for equalizing the A. C. characteristics of the valves for effective input potentials approximating those to be applied, means for connecting a variable known impedance in one of said input circuits and a second impedance in the other input circuit and passing a uniform alternating current through the two impedances in series, means to determine whether the output currents are equal at any setting of the known variable impedance, and means to substitute the second impedance for the known impedance and to place a variable known impedance at the position in the circuits first occupied by the second impedance.

17. In an apparatus of the class described, two similar electron tubes each having a heated cathode, grid, plate, grid circuit, and plate circuit, means for lowering the grid potentials with respect to the cathodes, means for raising the plate potentials an equal and substantially constant amount with respect to the cathodes, means for equalizing the A. C. characteristics of the tubes for effective grid potentials approximating those to be applied, means for connecting a variable known impedance in one grid circuit and for connecting a second impedance in the other grid circuit, means for passing a uniform alternating current through the two impedances in series, means for comparing the plate currents for any setting of the variable known impedance, and means to substitute the second impedance for the variable impedance and to place a variable known impedance at the position in the circuits first occupied by the second impedance.

18. The process of making an electrical measurement which includes equalizing the A. C. characteristics of two similar electrical valves for effective input potentials approximating those to be applied, placing in the input circuit of one valve a source of potential which has across it an alternating voltage of unknown and substantially constant effective value, placing in the input circuit of the other a source of potential which has across it a known variable alternating potential difference, varying the known potential difference to equalize the output currents of the two valves, substituting the source of unknown potential for the source of known potential, placing a source of potential which has across its poles a known variable potential difference at the position in the circuits first occupied by the source of unknown potential, and again varying the known potential to equalize the output currents.

19. In an apparatus of the class described, two similar electrical valves having input and output circuits, means for equalizing the A. C. characteristics of the valves for effective input potentials approximating those to be used, a source of potential in the input circuit of one valve, across the poles of which is an alternating potential difference, and one of the electrical quantities characteristic of which and related through the voltage-current-impedance equation is to be determined, a second source of potential in the input circuit of the other valve, across the poles of which is an alternating potential difference, and one of the similarly-related electrical quantities characteristic of which is known and variable, each of the other related quantities characteristic of the sources of potential which is unknown being common to both sources, means to compare the output currents of the valves for any setting of said known variable electrical quantity, means to substitute the first source of potential for the second source, and means to replace the source of potential one electrical quantity characteristic of which is to be determined by a source across the poles of which is an alternating potential difference, and one of the related electrical quantities characteristic of which is known and variable, each of the other related quantities, characteristic of the sources placed in the circuits by the last two means, which is unknown being common to both such sources.

20. In an apparatus of the class described, two similar electron tubes each having a heated cathode, grid, plate, grid circuit, and plate circuit, means for lowering the grid potentials with respect to the cathodes, means for raising the plate potentials an equal and substantially constant amount with respect to the cathodes, means for equalizing the A. C. characteristics of the tubes for effective grid potentials approximating those to be applied, a source of potential in the grid circuit of one tube, across the poles of which is an alternating potential difference, and one of the electrical quantities characteristic of which and related through the voltage-current-impedance equation is to be determined, a second source of potential in the grid circuit of the other tube, across the poles of which is an alternating potential difference, and one of the similarly-related electrical quantities characteristic of which is known and variable, each of the other related quantities, characteristic of the sources of potential, which is unknown being common to both sources, means to determine whether the plate currents of the tubes are equal at any setting of the known variable electrical quantity, and means to interchange the first source and the second source in their respective positions in the circuits.

21. In an apparatus of the class described, two similar electron tubes each having a heated cathode, grid, plate, grid circuit, and plate circuit, means for lowering the grid potentials with respect to the cathodes, means for raising the plate potentials an equal and substantially fixed amount with respect to the cathodes, means for equalizing the A. C. characteristics of the tubes for effective grid potentials approximating those to be applied, a source of potential in the grid circuit of one tube which has across it an alternating voltage of unknown and substantially constant effective value, a source of potential in the grid circuit of the other tube which has across its poles a known variable alternating potential difference, means to compare the plate currents of the tubes for any setting of the known variable alternating potential difference, means to substitute the source of unknown potential for the source of known potential, and means for placing a source of potential which has across it a known variable alternating potential difference at the position in the circuits first occupied by the source of unknown potential.

22. The process of measuring an impedance which includes equalizing the A. C. characteristics of two similar electrical valves for effective input potentials approximating those to be used, placing said impedance in the input circuit of one electrical valve, placing a known variable impedance in the input circuit of the other, passing a uniform alternating current through the two impedances in series, varying the known impedance to equalize the output currents of the two valves, substituting the unknown impedance for the known impedance, placing a known variable impedance at the position in the circuits first occupied by the unknown impedance, and again varying the known impedance to equalize the output currents.

GUY A. STONE.